United States Patent
Kuo

(10) Patent No.: US 6,615,283 B1
(45) Date of Patent: Sep. 2, 2003

(54) KEYBOARD SYSTEM

(75) Inventor: Chunn-Cherh Kuo, Taipei (TW)

(73) Assignee: Silitek Corporation, Taipei (TW)

( * ) Notice: Subject to any disclaimer, the term of this patent is extended or adjusted under 35 U.S.C. 154(b) by 0 days.

(21) Appl. No.: 09/479,218

(22) Filed: Jan. 7, 2000

(51) Int. Cl.[7] ................................................ G06F 3/00
(52) U.S. Cl. ................... 710/1; 710/5; 710/20; 710/36; 712/225; 455/420
(58) Field of Search .............. 710/1, 5, 12, 15, 710/17, 18, 20, 58, 62, 72, 8, 104, 7, 36, 106; 455/420; 712/225

(56) References Cited

U.S. PATENT DOCUMENTS

| | | | | |
|---|---|---|---|---|
| 5,428,806 A | * | 6/1995 | Pocrass | 710/104 |
| 5,566,205 A | * | 10/1996 | Delfine | 375/219 |
| 5,877,745 A | * | 3/1999 | Beeteson et al. | 345/156 |
| 6,002,748 A | * | 12/1999 | Leichner | 379/48 |
| 6,114,957 A | * | 9/2000 | Westrick et al. | 340/568.1 |
| 6,128,484 A | * | 10/2000 | Singkornrat et al. | 455/420 |
| 6,211,862 B1 | * | 4/2001 | Park et al. | 345/169 |
| 6,225,984 B1 | * | 5/2001 | Crawford | 345/173 |
| 6,364,834 B1 | * | 4/2002 | Reuss et al. | 600/300 |

* cited by examiner

Primary Examiner—Jeffrey Gaffin
Assistant Examiner—Rijue Mai
(74) Attorney, Agent, or Firm—Rosenberg, Klein & Lee

(57) ABSTRACT

A keyboard system includes keyboard having an internal circuit therein, at least one I/O device, and a transceiver module. The transceiver module on the main body of the keyboard receives signals from I/O devices and transmits audio signals from at least one external device connected to the keyboard system. The keyboard further includes a plurality of pointers indicative of which I/O device is connected to the keyboard.

15 Claims, 2 Drawing Sheets

KEYBOARD SYSTEM

FIELD OF THE INVENTION

The present invention relates to a keyboard system, especially to a keyboard system having a transceiver for receiving signals from I/O device.

BACKGROUND OF THE INVENTION

The conventional keyboards generally receive signals only from only one I/O device such as a mouse, a trackball, a digital pad, or a joystick, and lack the ability of receiving signals from multiple I/O devices and transmitting audio signals from external devices to I/O devices.

Moreover, when the keyboard is designed to connect with various I/O devices through signal lines, the keyboard has to provide with a plurality of connectors for these I/O devices. The cost is high and extra space of the keyboard will be occupied It is the object of the present invention to provide a keyboard system receives signals from multiple input/output (I/O) devices through a wireless transceiver module, thus saving space of the keyboard.

To achieve the above object, the keyboard system according to the present invention comprises a transceiver module on the main body of the keyboard, which can receive signals from multiple I/O devices. The transceiver module is connected to a processor of the internal circuit of the keyboard. The processor is connected to a universal serial bus (USB), a plurality of pointers, a memory unit, and a channel selector. The processor deciphers ID codes from signals sent from the multiple I/O devices and informs users which I/O device is connected to the keyboard. The keyboard further transmits audio signals from external devices.

The various objects and advantages of the present invention will be more readily understood from the following detailed description when read in conjunction with the appended drawing, in which:

DETAILED DESCRIPTION OF THE PREFERRED EMBODIMENT

Figure 1:
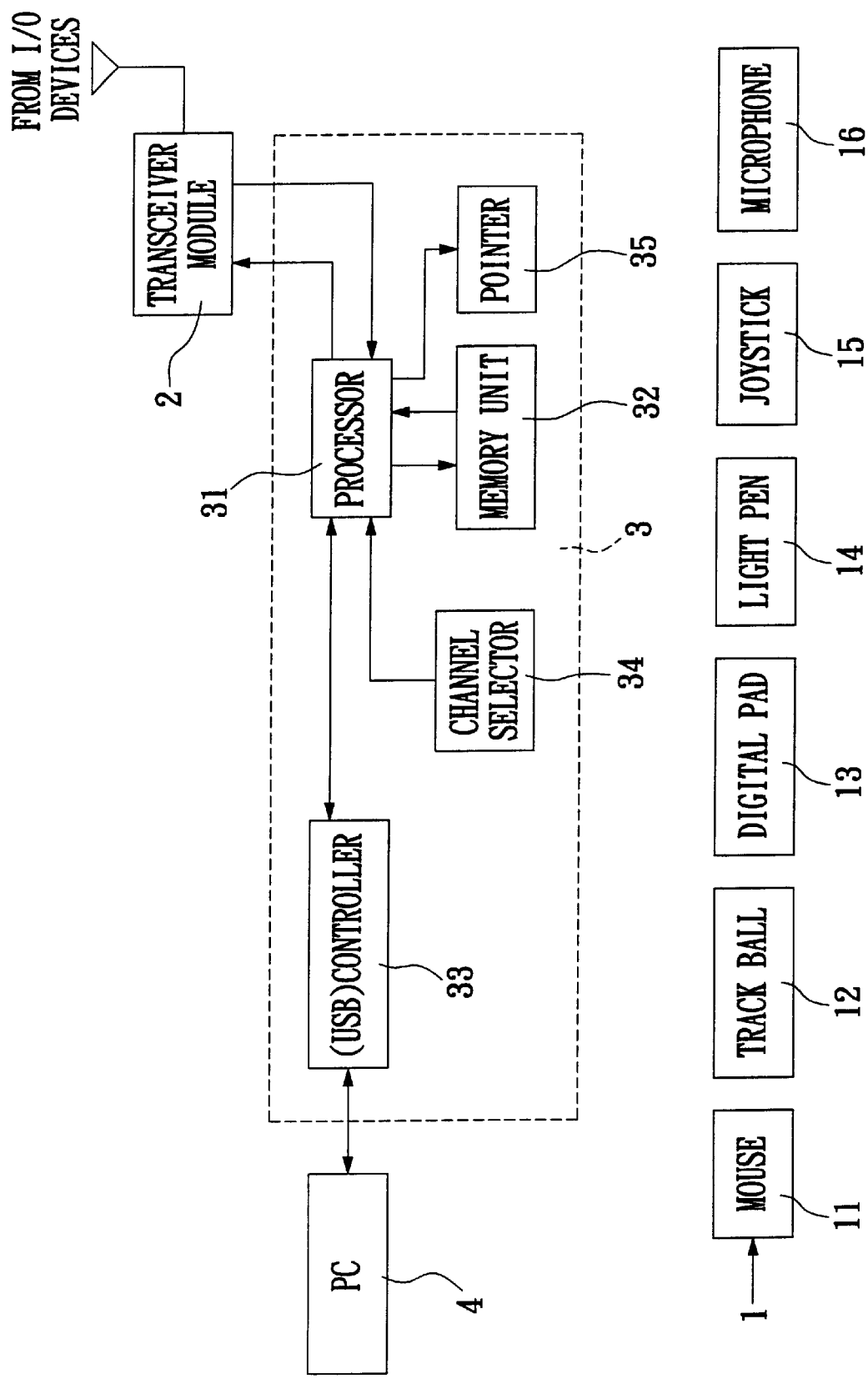
FIG. 1 is a block diagram of the first preferred embodiment of the present invention.

As shown in FIG. 1, the keyboard system according to the present invention comprises multiple I/O devices 1, a transceiver module 2, and a keyboard 3.

In the demonstrative preferred embodiment, the multiple I/O devices can be lo-power I/O devices such as a mouse 11, a trackball 12, a digital pad 13, a light pen 14, a joystick 15, or a microphone 16. The multiple I/O devices 1 communicate with a processor 31 of an internal circuit of the keyboard 3 through signal lines or the transceiver module 2 through a wireless medium such as a RF(radio frequency) or an IR(infrared) module.

The transceiver module 2 is internally or externally assembled to the main body of the keyboard 3 and communicates with the processor 31 of the internal circuit of the keyboard 3. The transceiver module 2 receives and demodulates the signal sent from the multiple I/O devices 1, and then sends the demodulated signals to the processor 31, wherein the signal includes ID codes of corresponding I/O devices and data to the inputting unit and data. The processor 31 receives these demodulated sign. The processor 31 receives the demodulated signal to identify which I/O device is connected to the keyboard from the ID code of the demodulated signal and to encode the demodulated signal into the digitalized signal.

The internal circuit of the keyboard 3 comprises a processor 31, a memory unit 32, a USB controller 33, a channel selector 34, and a plurality of pointers 35. The output of the processor 31 is electrically connected to the USB controller 33. The output of the USB controller is electrically connected to a PC 4 through the signal connection line, and transmits the data read from the processor 31 to the PC 4 in the format defined by the USB controller 33. The processor 31 is electrically connected to the plurality of pointers 35 to inform user of whether the transceiver module 2 receives the signal sent from the multiple I/O devices and which I/O device sends the signal.

When the transceiver module 2 receives the signal containing ID codes of the corresponding I/O device 1 and data thereof, the transceiver module 2 demodulates the signal and sends the demodulated signal to the processor 31. Afterward, the processor 31 receives the demodulated signal to identify the specific I/O device from the ID code of the demodulated signal and to encode the demodulated signal into the digitalized signal. The digitalized signal is transmitted through the USB controller 33 to the PC 4 in the format defined by the USB controller.

Figure 2:
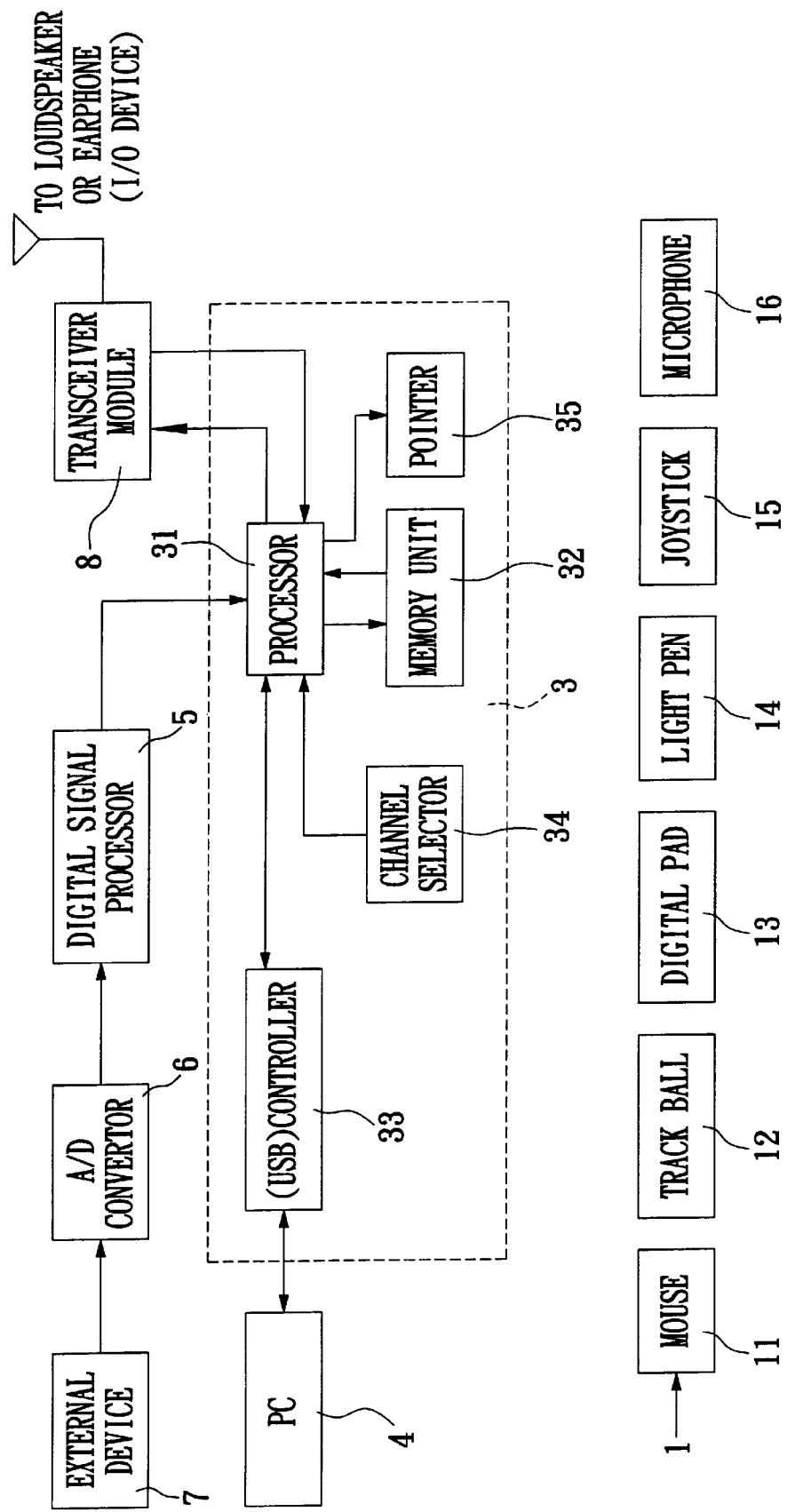
FIG. 2 is the block diagram of the second preferred embodiment of the present invention.

With reference now to FIG. 2, a transceiver module 2 is used to transmit audio signals from an external device 7. Moreover, the processor 31 is further connected to a digital signal processor (DSP) 5. The input of the DSP 5 is connected to an A/D converter 6.

The A/D converter 6 serves to convert the audio signals of the external device 7 such as a CD-ROM or microphone to a digitalized expression. Afterward, the A/D converter 6 sends the digitalized signals to the DSP 5 for encoding, and the encoded signal is sent to the processor 31. The processor 31 deciphers the encoded signal and then transmits out the deciphered signal through the transceiver module 2.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention in the appended claims.

I claim:

1. A keyboard system comprising:
    a keyboard having an internal circuit therein, the keyboard being operably coupled to a computer device;
    at least one input/output device wirelessly coupled to the keyboard for operable coupling to the computer device thereby; and,
    a transceiver module arranged on the keyboard and electrically connected to the internal circuit for receiving from the input/output device signals containing identification information corresponding thereto, so as to allow the internal circuit to identify the input/output device generating the signals.

2. The keyboard system of claim 1, wherein the internal circuit comprises a processor connected to a universal serial bus (USB) controller, and the USB controller is further connected to a PC through a connection line.

3. The keyboard system of claim 1, wherein the internal circuit further includes a plurality of pointers indicative of which input/output device has sent out the signals.

4. The keyboard system of claim 1, wherein the input/output device is connected to the keyboard through a wireless medium.

5. The keyboard system of claim 1, wherein the input/output device is a mouse.

6. The keyboard system of claim 1, wherein the input/output device is a trackball.

7. The keyboard system of claim 1, wherein the input/output device is a digital pad.

8. The keyboard system of claim 1, wherein the input/output device is a light pen.

9. The keyboard system of claim 1, wherein the input/output device is a joystick.

10. The keyboard system of claim 1, wherein the input/output device is a loudspeaker.

11. The keyboard system of claim 1, wherein the input/output device is an earphone.

12. A keyboard system comprising:

a keyboard having an internal circuit therein, the internal circuit including a processor connected to a universal serial bus (USB) controller, the USB controller being connected to a PC through a connection line;

at least one input/output device; and a transceiver module arranged on the keyboard and electrically connected to the internal circuit for receiving signals from the input/output device so as to allow the internal circuit to identify which input/output device is connected to the keyboard;

the internal circuit further including an A/D converter for converting audio signals into digitalized audio signals and a digital signal processor connected to the A/D converter, wherein the digitalized audio signals are encoded by the digital signal processor, deciphered by the processor, and then transmitted out through the transceiver module.

13. The keyboard system of claim 12, wherein the audio signals are from an external device.

14. The keyboard system of claim 13, wherein the external device is a microphone.

15. The keyboard system of claim 13, wherein the external device is a CD-ROM.

* * * * *